United States Patent [19]
Fling et al.

[11] Patent Number: 5,546,484
[45] Date of Patent: Aug. 13, 1996

[54] FIBER OPTIC SWITCH USING POLISHED-TYPE DIRECTIONAL COUPLER

[75] Inventors: John J. Fling, Gaviota; Herbert J. Shaw, Stanford; Michel J. Digonnet, Palo Alto; Narinder S. Kapany, Woodside, all of Calif.

[73] Assignee: Kaptron, Inc., Palo Alto, Calif.

[21] Appl. No.: 453,540

[22] Filed: May 25, 1995

Related U.S. Application Data

[62] Division of Ser. No. 323,222, Oct. 14, 1994.

[51] Int. Cl.$^6$ .................. G02B 6/26; G02B 6/42
[52] U.S. Cl. .................. 385/16; 385/25
[58] Field of Search .................. 385/16, 32, 50, 385/25

[56] References Cited

U.S. PATENT DOCUMENTS 5,011,251  4/1991  Miller et al. .................. 385/43
5,148,503  9/1992  Skeie .................. 385/16

*Primary Examiner*—Rodney B. Bovernick
*Assistant Examiner*—Robert E. Wise

[57] ABSTRACT

A fiber optic switch module that can be incorporated into switch designs characterized by negligible crosstalk. The switch module is capable of operation over two wavelength bands. A 2×2 switch module has an open or bar state in which polished portions of the fiber segments are separated from each other and a closed or cross state where the polished portions are in optical contact with each other. The module has arbitrarily low crosstalk in the bar state, but typically some crosstalk in the cross state. In one embodiment, the third port of a first 2×2 module is coupled to the first port a second 2×2 module while no connections are-made to the second ports of the modules or to the third port of the second module. Fiber parameters (core radius and numerical aperture) and fabrication parameters (radius of curvature of the fibers in the interaction region and minimum edge-to-edge spacing between the fiber cores) are chosen so that the switch module has high coupling ratio (close to unity) in two distinct wavelength bands.

8 Claims, 15 Drawing Sheets

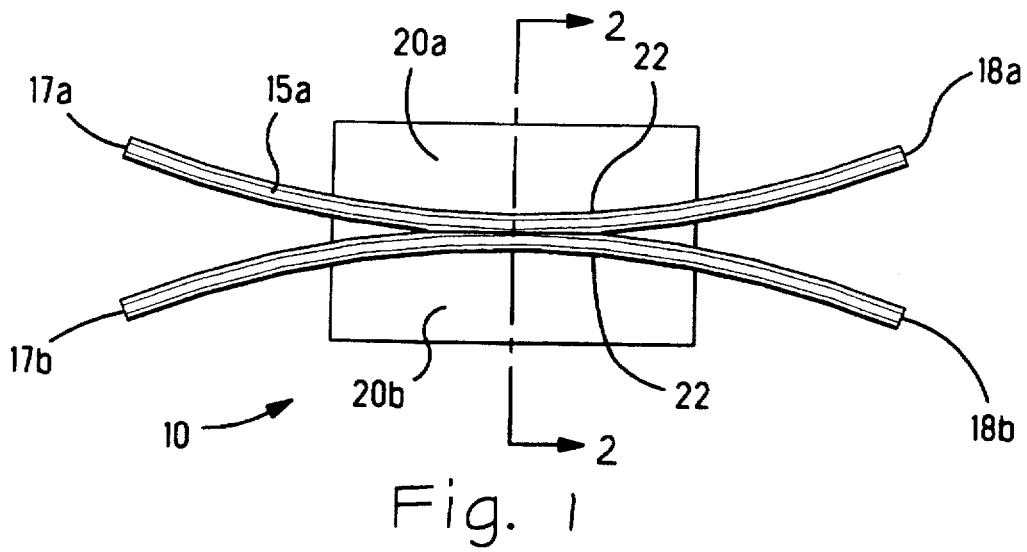
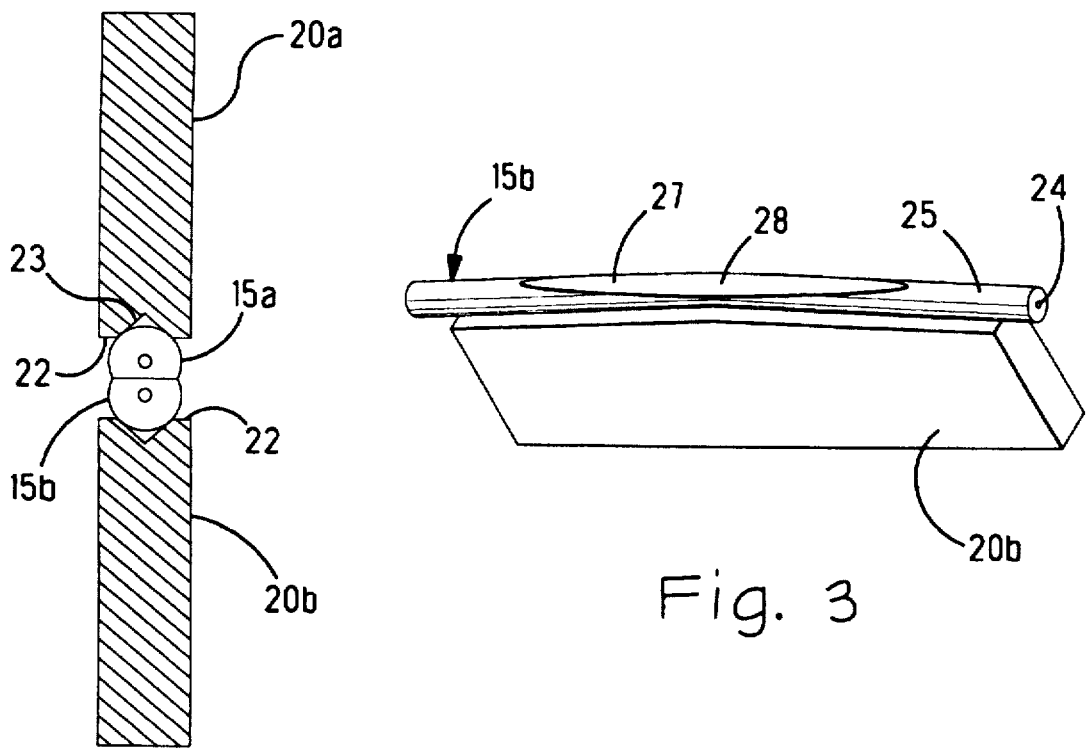

5,546,484

FIBER OPTIC SWITCH USING POLISHED-TYPE DIRECTIONAL COUPLER

This application is a division of Ser. No. 08/323,222, filed on Oct. 14, 1994.

BACKGROUND OF THE INVENTION

The present invention relates generally to fiber optic devices, and more specifically to fiber optic switches based on directional couplers.

The prior art reveals a number of approaches to switching light in one optical fiber to a selected one of a plurality of other optical fibers. U.S. Pat. No. 4,329,017 to Kapany et al. shows a movable concave reflector that focuses light emerging from the end of an input fiber onto the end of a selected one of a number of output fibers. U.S. Pat. No. 5,028,104 to Kokoshvili shows how such a switch can be configured as a bypass switch. U.S. Pat. No. 5,037,169 to Chun shows a different approach, using a Fabry-Perot etalon filled with a semiconductor medium whose index of refraction can be changed by optical, electrical, or thermal techniques, whereupon the incident light is reflected to one port or transmitted to another, depending on the state of the etalon material.

Yet another approach uses an evanescent-wave directional coupler as a switch (H. Berthou and L. Falco, "Switching Characteristics of a Piezoelectrical Actuated Evanescent-Wave Directional Coupler," Electronic Letters, Vol 23, No. 9, pp 469–470 (Apr. 23, 1987). In this type of switch, a fiber segment is glued in a variable-width V-groove in a silicon substrate. The fiber is then tangentially ground and polished to define an intermediate portion of greatly reduced cladding thickness. The polished fiber portion extends about 100 nm above the silicon surface. Two of these substrate assemblies are spaced apart with the polished fiber portions facing, and the substrate assemblies are flexed to bring the polished fiber portions together. When the polished portions are brought into contact, light traveling in one of the fibers is coupled into the other by the mechanism of evanescent wave coupling. The coupling ratio depends on the distance between fibers, the length of the contact region (the interaction length), the thickness of the cladding in the interaction region, the fiber parameters, and the wavelength of the light. A detailed discussion of the operation of fiber directional couplers can be found in Michel J. F. Digonnet and Herbert J. Shaw, "Analysis of a Tunable Single Model Optical Fiber Coupler," IEEE Journal of Quantum Electronics QE18, 4, 746–754 (April 1982); and Michel Digonnet and H. J. Shaw, "Wavelength Multiplexing in Single-Mode Fiber Couplers," Applied Optics 22, 3, 484–491 (Feb. 1, 1983).

Although the directional coupler approach to switches is potentially fruitful, a number of serious technical problems come to mind. First, the coupler is characterized by a non-negligible degree of cross-talk, both as an inherent matter and as a result of small differences in the coupling from one switch closure to the next. Additionally, the coupling is wavelength sensitive, so a switch that operates at one wavelength is unlikely to operate satisfactorily at a different wavelength. 1308 nm and 1550 nm are two standard wavelengths for fiber optic communications systems, and it would be desirable if a single switch could work for both. Indeed, both wavelengths are often present simultaneously in a multiplexed system. A further problem is that the fabrication tolerances are typically very tight, and minor dimensional variances are likely to compromise performance significantly.

SUMMARY OF THE INVENTION

The present invention provides a fiber optic switch module that can be incorporated into switch designs characterized by negligible crosstalk. The switch module is capable of operation over two wavelength bands.

A 2×2 switch module according to the present invention comprises first and second segments of optical fiber, the ends of which define four ports. Respective intermediate portions of the fiber segments are mounted to facing convex surfaces of respective substrates, which are provided with a mechanism that allows them to be moved towards and away from each other.

Facing portions of the fiber segments are polished to reduce the cladding thicknesses, thereby resulting in oval-shaped flat surfaces formed in the cladding. The cladding is sufficiently thin in these portions that when the polished portions are brought into contact with each other, the light traveling along one of the fiber segments is coupled into the other fiber segment by the mechanism of evanescent wave coupling. The module thus has an open or bar state in which the polished portions of the fiber segments are separated from each other and a closed or cross state where the polished portions are in optical contact with each other. The module has arbitrarily low crosstalk in the bar state, but typically some crosstalk in the cross state.

A preferred construction for each fiber substrate is that of a thin plate having parallel flat surfaces and a convex curve along a portion of the plate's perimeter. The surface of the edge along this curved portion of the perimeter is perpendicular to the planes of the flat surfaces, and defines the convex surface to which the fiber segment is mounted. The convex surface is preferably formed with a circumferentially extending V-groove in which the fiber segment is seated. In use, the fiber and substrate remain as a rigid assembly and are not subjected to flexure. Thus repeatability from shot to shot is maintained.

According to a further aspect of the invention a novel switch architecture allows a number of modules to be combined to provide switches with arbitrarily low crosstalk in all states. In one embodiment, the third port of a first 2×2 module is coupled to the first port of a second 2×2 module while no connections are made to the second ports of the modules or to the third port of the second module. The modules are constrained so that only one is in the cross state at any given moment. If the first port of the first module is considered the input port of the switch, the fourth port of the second module is considered the first output port of the switch, and the fourth port of the first module is considered the second output port of the switch, the switch functions as a 1×2 switch. The modules are reversible so the switch can also function as a 2×1 switch with the input ports and output ports reversed. Two pairs of modules can be connected to provide a 2×2 fiber optic switch.

In an alternative embodiment of a 1×2 switch, both modules are constrained so that both are in the cross state or both are in the bar state. An alternative embodiment of a 2×2 switch is constructed from three 2×2 modules, with the constraint that all modules be in the cross state or all modules be in the bar state. These alternative embodiments provide reduced, but not necessarily arbitrarily low, crosstalk in all states.

According to a further aspect of the invention, a supporting structure for the 1×2 switch comprises first and second fixed outer elements and a movable center element between the outer elements. A first pair of substrates for the first module are mounted to the first outer element and to a region of the center portion proximate the first outer element. A second pair of substrates for the second module are mounted to the second outer element and to a region of the center element proximate the second outer portion. When the center element is moved toward the first fixed element, the fiber segments mounted to the first pair of substrates contact each other so that the first module is in the cross state. At the same time, the fiber segments mounted to the second pair of substrates are separated from each other so that the second module is in the bar state.

According to a further aspect of the invention, the polishing of the fibers and the mounting of the substrates to the switch structure are carried out in a manner that ensures that the polished fiber surfaces make intimate contact with each other when the switch module is closed. The switches are fabricated by cementing each fiber segment to its respective substrate and then polishing the fiber until the desired degree of polish is achieved. It is almost inevitable that there will be some degree of non-perpendicularity between the polishing wheel that polishes the surface of the fiber and the plane of the table on which the substrate is supported during the polishing. This results in a corresponding degree of non-perpendicularity between the plane of the substrate and the polished fiber surface, which can cause insufficient contact for reliable switch operation.

The preferred switch construction addresses the problem by accepting as inevitable that there will be some tilt introduced by the fiber polishing process, but recognizes that the tilt that is introduced in the course of polishing the fiber is relatively constant from fiber to fiber, once the polishing machine is set up. The tilt correction is carried out by polishing first and second fiber/substrate assemblies with the same setting of the polishing machine, so that to the extent there is a resultant non-perpendicutarity, it is the same for both assemblies. The assemblies are then mounted to the switch structure with one of the assemblies having the same orientation that it had when its fiber was polished and the other having the opposite orientation (i.e., flipped over), whereupon the tilt angles are equal and opposite, and cancel.

According to a further aspect of the invention, the outer fixed portions are provided with an adjustment that allows the correction of minor lateral misalignments between the abutting polished fiber portions. This adjustment is typically made during fabrication of the switch, and is not normally changed during use of the switch.

According to a further aspect of the invention, fiber parameters (core radius and numerical aperture) and fabrication parameters (radius of curvature of the fibers in the interaction region and minimum edge-to-edge spacing between the fiber cores) are chosen so that the switch module has high coupling ratio (close to unity) in two distinct wavelength bands. It has been found that the edge-to-edge spacing is a relatively critical parameter and that it is possible to achieve near-optimum results by overpolishing the fibers and then offsetting the fibers, either laterally or longitudinally.

A further understanding of the nature and advantages of the present invention may be realized by reference to the remaining portions of the specification and the drawings.

BRIEF DESCRIPTION OF THE DRAWINGS

FIGS. 1–3 are top plan, cross-sectional, and partial perspective views, respectively, of a basic 2×2 switch module according to the present invention;

DESCRIPTION OF SPECIFIC EMBODIMENTS

Basic 2×2 Switch Module

Figure 4:
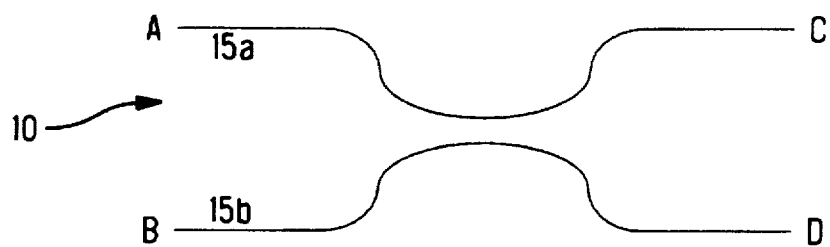
FIGS. 4 and 5 are schematic representations of the basic 2×2 module in the bar and cross states, respectively.

FIGS. 1–3 are top plan, cross-sectional, and partial perspective views, respectively, of a basic 2×2 switch module 10 (typically referred to as the module) according to the present invention. The module comprises first and second segments of optical fiber 15a and 15b, respective first ends 17a and 17b of which define first and second ports, and respective second ends 18a and 18b of which define third and fourth ports. Although the modules are reversible, it is sometimes convenient to view the first and second ports as input ports, the third and fourth as output ports.

The fiber segments are mounted to respective first and second plate-like substrates 20a and 20b, each of which has a convex cylindrical surface 22 (characterized by a radius of curvature). The substrate radius of curvature is typically significantly larger than the other dimensions of the substrate, so that the angular extent of the cylindrical surface is a relatively small fraction of a full circle. The substrates are arranged with their respective cylinder axes parallel and their convex surfaces facing each other. The convex surfaces are preferably formed with circumferentially extending V-grooves 23. An intermediate portion of each fiber segment is mounted so it conforms to and extends circumferentially along the convex surface. The fiber is seated in the V-groove and is thus maintained in proper alignment.

Each fiber has a core 24 and a cladding 25. Facing portions of the mounted fiber segments are polished to reduce their cladding thicknesses, resulting in an oval-shaped flat surface 27 (sometimes referred to as the polished surface or polished portion) formed in the cladding of each segment. The cladding has minimum thickness at a central location 28 on the polished surface.

The substrates are mounted to a structure, to be described below, that allows the substrates to be moved towards and away from each other. The substrates are aligned and the fiber segments polished so that flat surfaces 27 contact each other when the substrates are brought together. The cladding is sufficiently thin under the flat surfaces that when the fibers are brought into contact with each other, the fibers interact to define a directional coupler. The coupler operates to couple a desired fraction (preferably close to 100%) of the light traveling along one of the fibers into the other fiber by the mechanism of evanescent wave coupling. When the flat surfaces are in contact, the fiber cores have a certain minimum spacing. If the fibers have their locations of minimum cladding thickness aligned, the minimum edge-to-edge spacing between the cores is the sum of the minimum cladding thicknesses. If not, the minimum edge-to-edge spacing is greater.

Figure 5:
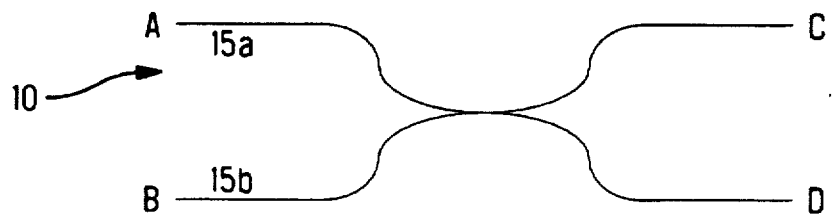

The module thus has an open or bar state in which the polished surfaces of the fiber segments are separated from each other and a closed or cross state where the polished surfaces are in optical contact with each other. FIGS. 4 and 5 are schematic views of module 10 in the bar and cross states, respectively. The four ports are designated A, B, C, and D. In the bar state, light is coupled between the A and C ports and between the B and D ports. In the cross state, light is coupled between the A and D ports and between the B and C ports. The alphabetic designation of ports is to some extent arbitrary, since the module is reversible.

For use as a binary switch the fibers are preferably configured to provide as much coupling as possible in the cross state. However, there is inevitably some amount of signal that is not coupled into the other fiber. Thus there is typically at least some crosstalk (say −20 db) in the cross state.

By providing enough separation between the fibers in the bar state, the module can be made to have arbitrarily low crosstalk in the bar state.

1×2 and 2×2 Switch Architectures

Figure 6:
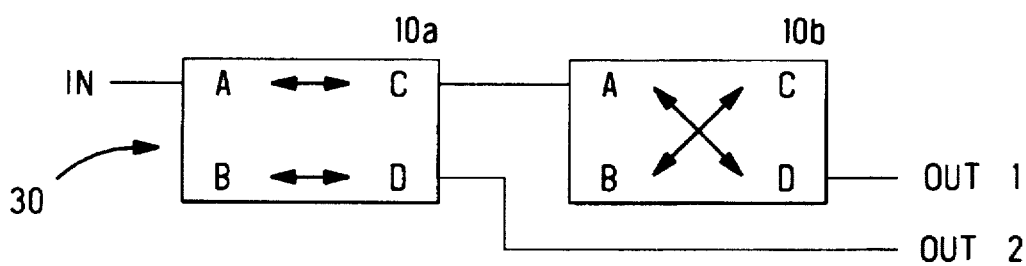
FIGS. 6–8 are schematics of a 1×2 fiber optic switch comprising two basic 2×2 modules.
Figure 7:
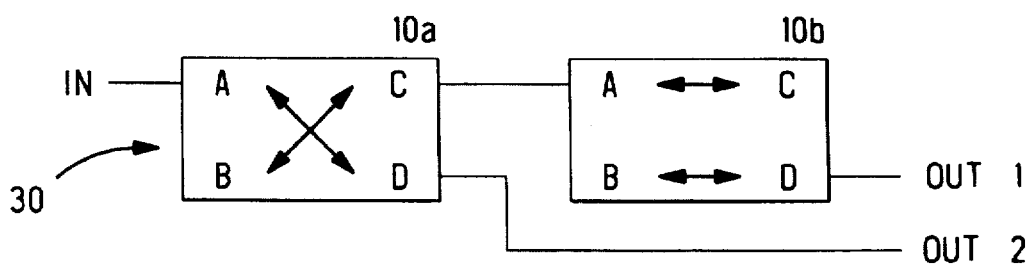

FIGS. 6 and 7 are schematics of a 1×2 fiber optic switch 30 using first and second 2×2 modules 10a and 10b, which are combined to provide a switch with arbitrarily low crosstalk in all states. In this embodiment, the A port of module 10a is considered the input port of the switch, the D port of module 10b is considered the first output port of the switch, and the D port of module 10a is considered the second output port of the switch. The C port of module 10a is coupled to the A port of module 10b while no connections are made to the B ports of the modules or to the C port of module 10b. The modules are constrained so that only one is in the cross state at any given moment. Clearly, the C port of module 10a could be coupled to the B port, in which case the C port of module 10b would be the first output port of the switch.

When operated in this direction, the switch functions to direct light at the input port to a selected one of the output ports. FIG. 6 shows a first position, where the first and second modules are in the bar and cross states respectively. In this position, light incoming to the input port exits the first output port, with substantially no crosstalk in the second output port since the first module is in the bar state. FIG. 7 shows a second position, where the first and second modules are in the cross and bar states respectively. In this position, light incoming to the input port exits the second output port, with substantially no crosstalk in the first output port since the second module is in the bar state and no light is input to its B port. The switch is reversible and can operate to direct light at a selected one of two input ports to a single output port.

Figure 8:
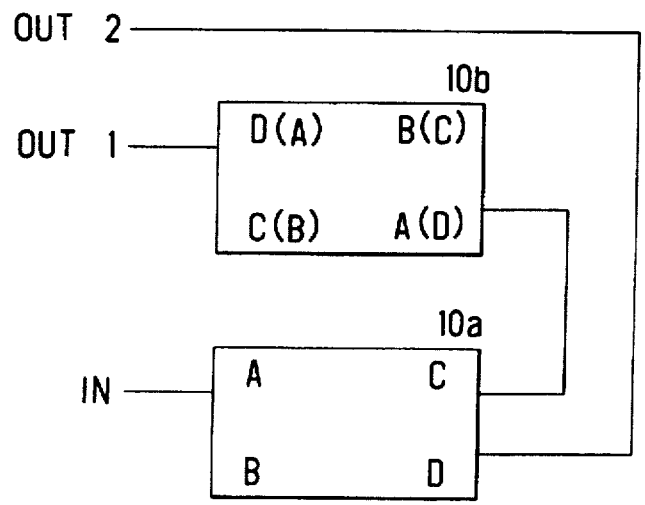

FIG. 8 is a schematic of the same switch in a folded configuration with module 10b wrapped back around module 10a. As will be seen below, this representation corresponds geometrically to a preferred physical implementation. It is sometimes helpful to draw the modules with the same port labeling (A upper left, ... D lower right), and this is shown in parentheses. To the extent that this alternative port labeling is desired, the A port of module 10a would still be considered the input port and the D port of module 10a would still be considered the second output port. However, the C port of module 10a would now be considered coupled to the D port of module 10b and the A port of module 10b would now be considered to define the first output port.

Figure 9:
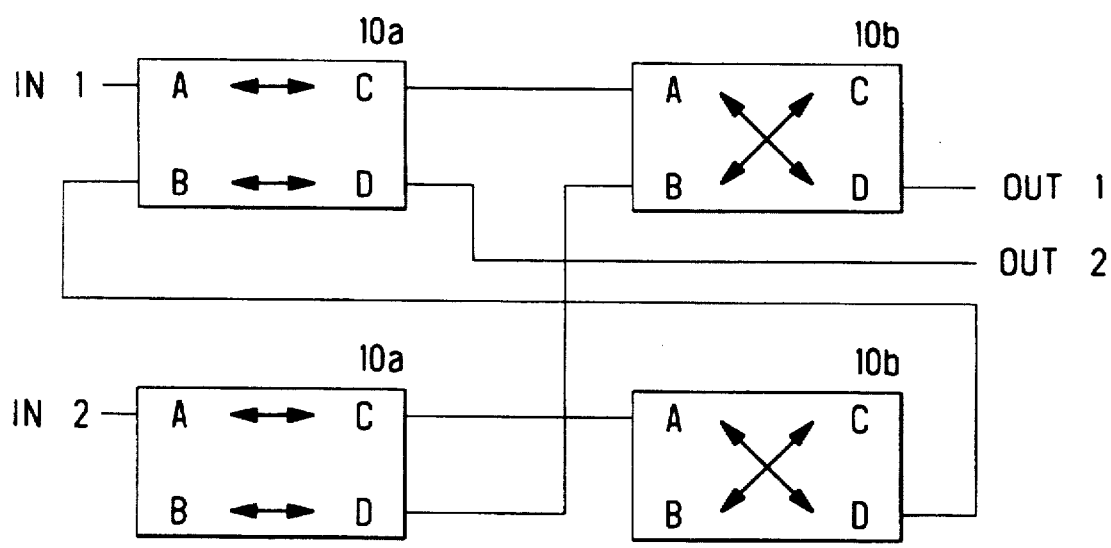
FIGS. 9 and 10 are schematics of a 2×2 fiber optic switch comprising four 2×2 basic modules.
Figure 10:
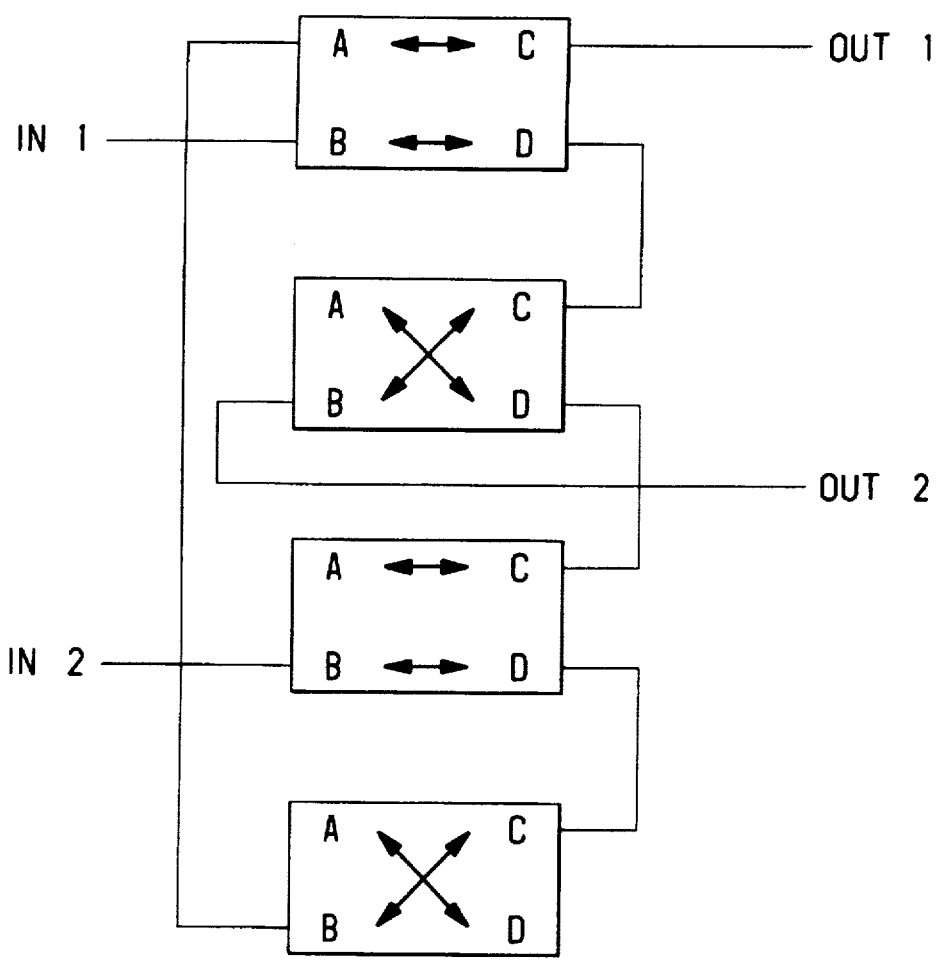

FIG. 9 is a schematic of a 2×2 fiber optic switch 40 comprising four 2×2 modules 10a, 10b, 10c, and 10d. Modules 10a and 10b are connected to each other as in 1×2 switch 30 described above. Modules 10c and 10d are similarly connected to each other, but then the two pairs of modules are connected to form the 2×2 switch. In particular, the D port of module 10d is coupled to the B port of module 10a, and the D port of module 10c is coupled to the B port of module 10b. The switch is illustrated in the state where modules 10a and 10c are in the bar state and modules 10b and 10d are in the cross state. FIG. 10 is a schematic of the same switch drawn somewhat differently.

Switch Module Mechanical Structure

Figure 13:
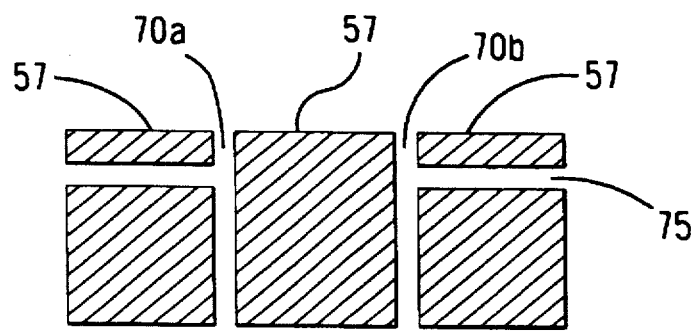
FIGS. 11–13 are top plan, side-elevational, and cross-sectional views, respectively, of a structure for implementing the 1×2 fiber optic switch.
Figure 11:
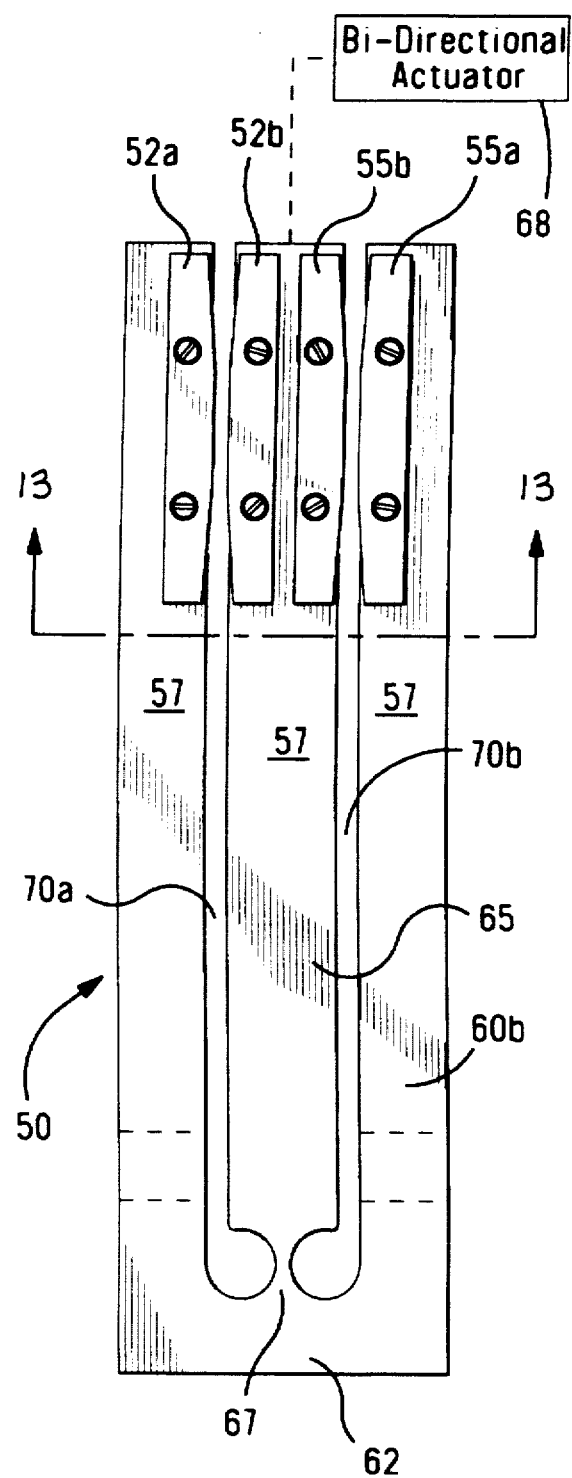
Figure 12:
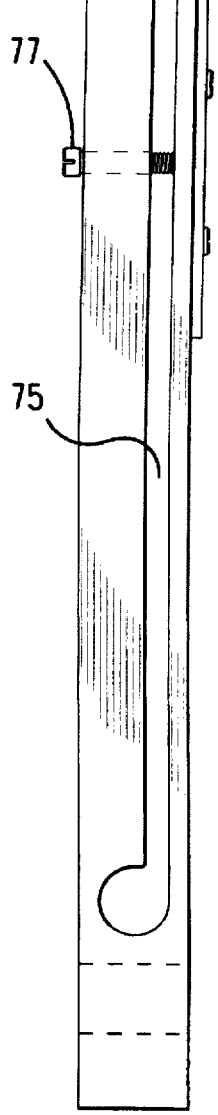

FIGS. 11–13 are top plan, side-elevational, and cross-sectional views, respectively, of a switch structure 50 for implementing the 1×2 fiber optic switch described above. In the interest of clarity, the fibers are not shown, but a first pair of substrates 52a and 52b for the first module and a second pair of substrates 55a and 55b for the second module are shown. The substrates are thin plate-like elements that extend substantially in the plane of FIG. 11 and are mounted to a substrate receiving surface 57. Representative dimensions are shown.

As can be seen in the plan view of FIG. 11, structure 50 comprises a U-shaped fixed portion having a pair of outer members 60a and 60b that are the arms of the U and a portion 62 that is the base of the U. A pivoting central member 65 is located between outer members 60a and 60b and extends parallel to them. The central member is mounted to base portion 62 by a hingeless pivot 67 for movement between a center-off position and either of a first position where it is closer to outer member 60a or a second position where it is closer to outer member 60b. Such movement is effected by a bi-directional actuator 68, which may be a piezoelectric device. A suitable actuator, manufactured by Physik Instruments can be obtained from Polytec PI, located in Costa Mesa, Calif.

Substrates 52a and 55a are mounted to outer members 60a and 60b, respectively, with their convex surfaces facing each other while substrates 52b and 55b are mounted to central member 65 with their convex surfaces facing away from each other. In actual practice, the fiber segments are mounted to their respective substrates and polished to provide the flat surfaces prior to mounting the substrates on structure 50. For reasons to be discussed below, substrate-receiving surface 57 of the switch structure is lapped flat across outer members 60a and 60b and central member 65.

The substrates and the switch structure are preferably aluminum. The hingeless pivot is formed by cutting a pair of slots 70a and 70b, and terminating the slots with circular holes, leaving a thin web of material. Due to the large section of the pivot along the axis perpendicular to the plane of the substrates, the substrates are constrained to move in their plane. The degree of movement is sufficiently small (a few tens of microns at most) that the web material is deformed elastically when the central member is moved from its center position to either of its other two positions.

As can be seen in the side view of FIG. 12, each of the outer members is formed with a slot 75 in a plane parallel to the plane of the substrates. The slot is terminated with a circular hole that allows the substrate on the outer member to be moved relative to the substrate on the central member in a direction perpendicular to the plane of the substrates. An adjustment screw 77 is provided to allow minute final adjustments to the alignment of the abutting polished fiber portions that make up the module. This adjustment is typically made during fabrication of the switch, and is not normally changed during use of the switch. The adjustment screw actually tilts the outer substrate relative to the central one, but since the hinge point is far removed from the screw and the amount of movement is small, the tilt is tantamount to a small translation. By using substrates of controlled thickness and having fiber-centering grooves, it is possible to limit the necessary adjustment to a few microns at most.

Figure 14:
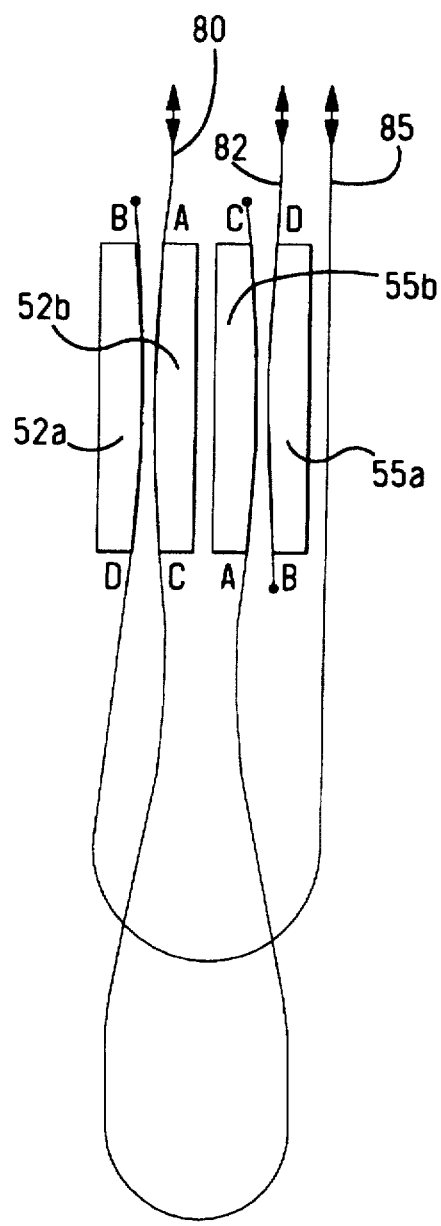
FIG. 14 shows the 1×2 switch with the fibers in place.

FIG. 14 shows the substrates and fiber configuration for implementing the 1×2 fiber optic switch illustrated in FIG. 8. In particular, substrates 52a and 52b correspond to module 10a while substrates 55a and 55b correspond to module 10b. Port letters A, B, C, and D also correspond to the port letters in FIG. 8 (disregarding the parenthetical alternative designation). A first fiber segment 80 is mounted to substrate 52b and is looped around so that it is also mounted to substrate 55b. One end defines the active port (input port), and the other end is non-reflectively terminated, corresponding to the null connection to the C port of module 10b. A second fiber segment 82 is mounted to substrate 55a. One end defines the active port (first output port), and the other end is non-reflectively terminated, corresponding to the null connection to the C port of module 10b. A third fiber segment 85 is mounted to substrate 52a. One end defines the active port (second output port), and the other end is non-reflectively terminated, corresponding to the null connection to the B port of module 10a.

Fabrication parameters are chosen so that the switch module has high coupling ratio (close to unity) in two distinct wavelength bands. The fiber parameters that affect the coupling ratio are the core radius and numerical aperture while the fabrication parameters that affect the coupling ratio are the radius of curvature of the fibers in the interaction region and the minimum edge-to-edge spacing between the fiber cores when the module is in the closed state. It has been found that the edge-to-edge spacing is a relatively critical parameter and that it is possible to achieve near-optimum results by overpolishing the fibers and then offsetting the fibers, either laterally or longitudinally. These design aspects will be discussed in detail below.

Tilt-Compensating Design

It is very important that the polished fiber surfaces make intimate contact with each other when the switch module is closed. The cross-sectional view of FIG. 2 shows the surfaces perpendicular to the plane of the substrates so that when the substrates move toward each other in their common plane, the polished surfaces contact each other. This constraint is not necessarily easy to achieve in practice. The switches are fabricated by cementing the fiber segment to its respective substrate and then polishing the fiber until the desired degree of polish is achieved. It is almost inevitable that there will be some degree of non-perpendicularity between the polishing wheel that polishes the surface of the fiber and the plane of the table on which the substrate is supported during the polishing. This results in a corresponding degree of non-perpendicularity between the plane of the substrate and the polished fiber surface, which can cause insufficient contact for reliable switch operation.

The preferred switch construction addresses the problem by accepting as inevitable that there will be some tilt introduced by the fiber polishing process, but achieves excellent contact by ensuring that the mating fibers have equal and opposite tilt angles. This is achieved in part by requiring that substrate-receiving surface 57 of the switch structure is lapped flat across outer members 60a and 60b and central member 65. The tilt correction is further based on the recognition that the tilt that is introduced in the course of polishing the fiber is relatively constant from fiber to fiber, once the polishing machine is set up. Thus, if two fiber/substrate assemblies are lapped, and one of the assemblies is then flipped over, the tilt angles are equal and opposite, and cancel.

Figure 15:
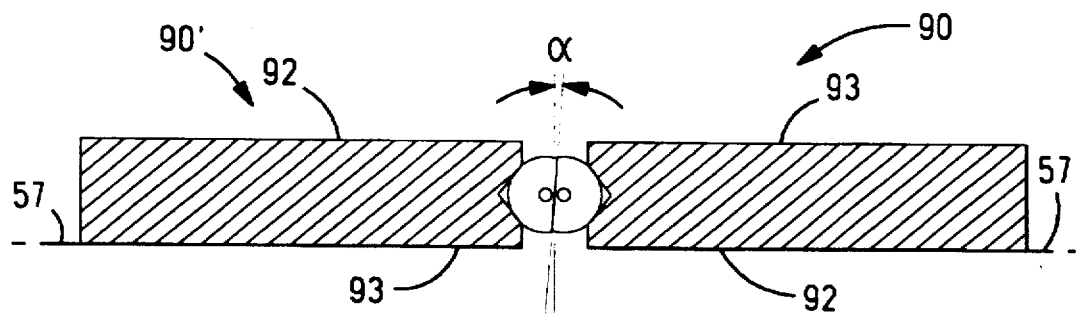
FIG. 15 is a cross-sectional view of the module showing the automatic tilt compensation.

FIG. 15 shows a first and second substrate assemblies 90 and 90' each having opposed parallel surfaces 92 and 93 Each assembly was lapped with one of the substrate surfaces in contact with the table during the polishing process. For definiteness, consider that surface 92 was in contact with the table, and that the polishing process introduced a tilt angle α between the table surface and the nominally perpendicular polished fiber surface. This tilt angle is shown greatly exaggerated. By mounting substrate assembly 90 with its surface 92 as the substrate-abutting surface and substrate assembly 90' with its surface 93 as the substrate-abutting surface, a configuration is achieved wherein the tilt angles are complementary and allow the polished surfaces to make intimate contact with each other.

Dual-Band Switch Design of Switch Module

Figure 16:
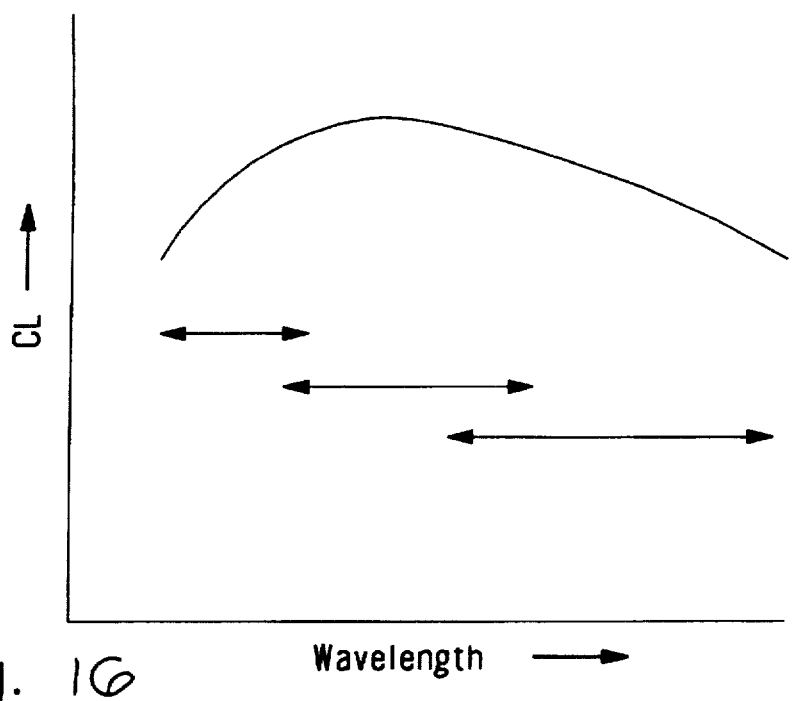
FIGS. 16–20 are plots of coupling ratio as a function of wavelength.

The coupling ratio K of a polished directional coupler is given by $K=\sin^2(CL)$ where C is the coupling coefficient and L is the interaction length. FIG. 16 illustrates the general shape of the product CL as a function of wavelength. It typically has a single maximum value at some wavelength and drops off monotonically on either side of that wavelength. Depending on the fiber and coupler parameters, the wavelength of maximum CL varies considerably, so that for the purpose of dual-band switch designs three types can be considered depending on which portion of the CL curve falls on the two band region of interest. These types are characterized by regions A, B, and C in the figure. For types A and C the slope of the curve is monotonically increasing or decreasing, respectively, over the wavelength range of interest. For type B the curve has zero slope somewhere within the wavelength range of interest.

The problem in dual-band switch design is to find a set of fabrication parameters for which the CL curve passes through or near the two points $(\lambda_1, i\pi/2)$ and $(\lambda_2, j\pi/2)$ in the $(\lambda, CL)$ plane, where i and j are odd integers and $\lambda_1$ and $\lambda_2$ are the center wavelengths of the two desired operating bands. Then the coupling ratio K is equal or approximately equal to unity at wavelengths $\lambda_1$ and $\lambda_2$, as desired for a low coupling loss in the cross state. We designate different switch designs by the letters A, B, or C for the type, with subscripts i,j to indicate the operating modes as above. Generally, it is preferred to avoid very high values of i and j for widest bandwidth at $\lambda_1$ and $\lambda_2$.

Figure 17:
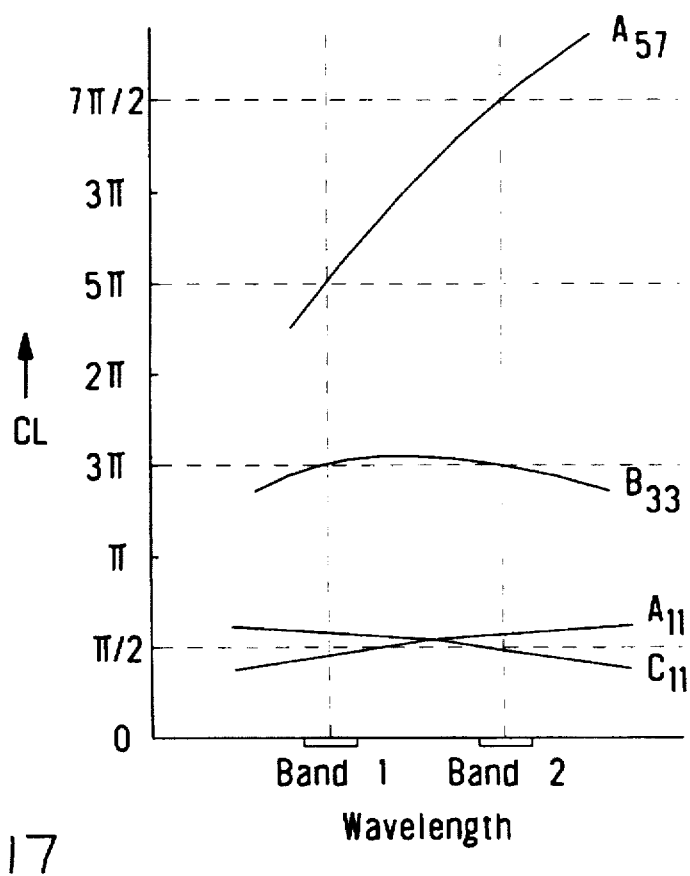

FIG. 17 illustrates several switch operating types and modes. Clearly switches of types $A_{ii}$ or $C_{ii}$, with i=j, cannot provide lossless coupling, because for best uniformity of loss across both operating bands K cannot be unity anywhere within the bands. However, low loss is possible if the slope of the CL curve is sufficiently low.

In the design of dual-band couplers we attempt to manipulate the CL curve such that it passes through a pair of intersection points of the dashed lines in FIG. 17. To do this, we work with two fiber parameters, e.g., core radius a and numerical aperture NA, and two fabrication parameters, namely $\delta_0$ and R, where $\delta_0$ is the minimum edge-to-edge spacing between the fiber cores when the switch is in the cross state, and R is the radius of curvature of the fibers in the interaction region.

Figure 18:
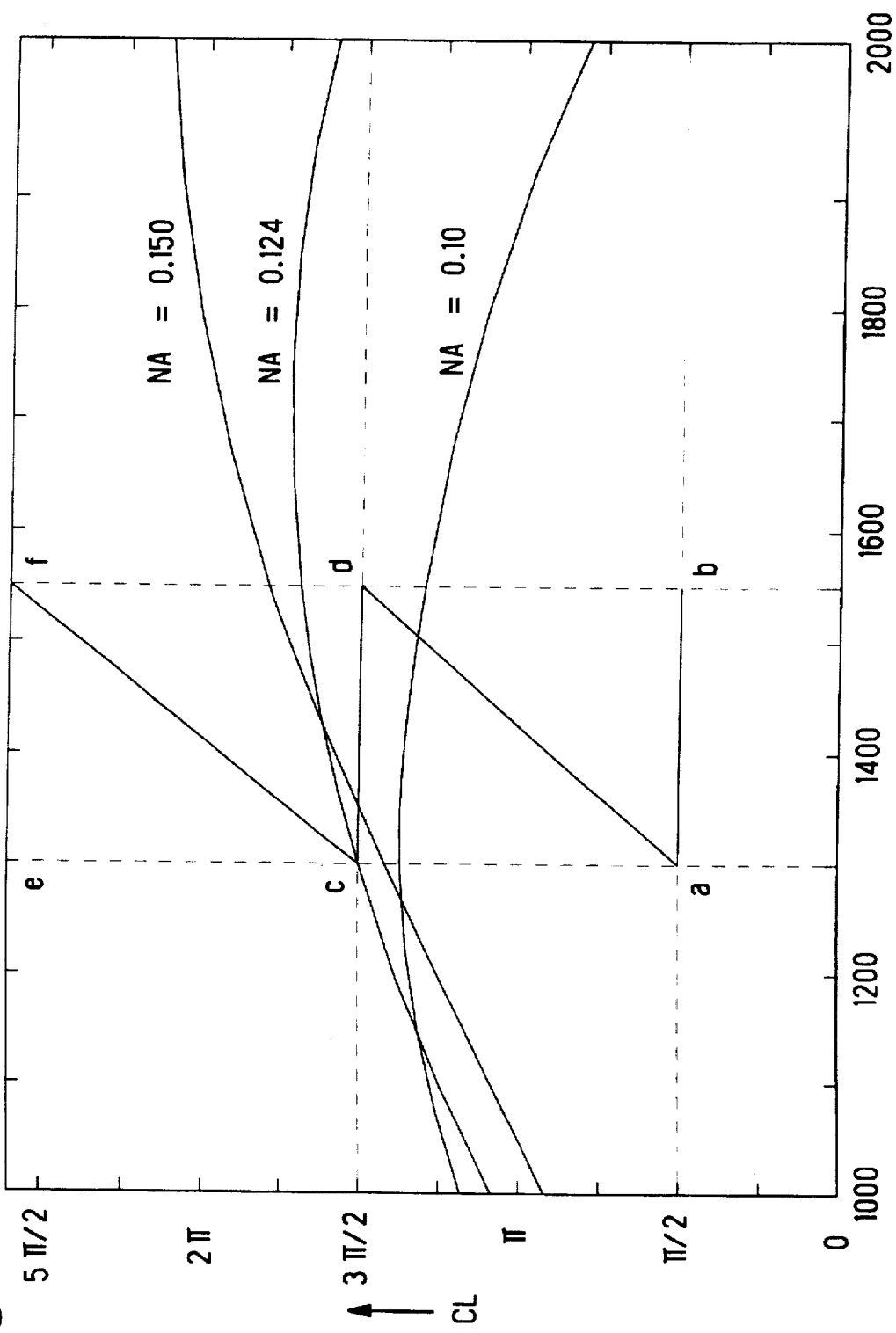

For the fiber presently being used (Corning SMF-28 CPC3), 2a=8.3 µm and NA=0.124. For the $\lambda_1$ and $\lambda_2$ values desired (1308 nm and 1550 nm), we find that we can work only with type A switches. Regions B and C of FIG. 16 lie too far into the long wavelength region of the spectrum. This is illustrated in FIG. 18. Generally, the peak of the CL curve can be moved toward lower wavelengths by decreasing NA, a, or $\delta_0$. FIG. 18 shows that to put the peak in the wavelength region between the two preferred operating bands, i.e., to have a type B device, would require the NA and the core size to be reduced below their desired ranges, i.e., to operate with fibers having too low a V-number to be practical (V≅1–1.2). Note that NA and a are smaller than for the present fiber, even with $\delta_0$=0. To facilitate device fabrication, it is preferable to have $\delta_0$ greater than 1µm. For these reasons, we have limited our switch designs to type A.

FIG. 18 also shows some considerations for the design of type A devices. For type $A_{11}$, $A_{33}$, and $A_{13}$ devices we would need the CL curve to approximate the lines ab, cd and ad respectively. For cases $A_{11}$ and $A_{33}$ we want to adjust parameters to minimize the slope of the CL curve in the region between the vertical dashed lines. The height of the CL curve is proportional to √R, which can be used to adjust the ordinates of the curve near points a and b, or c and d. For case $A_{13}$, the slope of the CL curve needs to be adjusted to approximate the line ad. We do not find this to be feasible, but a possible design exists for a type $A_{57}$ device approximating a line parallel to line cf but shifted vertically upward by π, achieved by increasing R.

Figure 19:
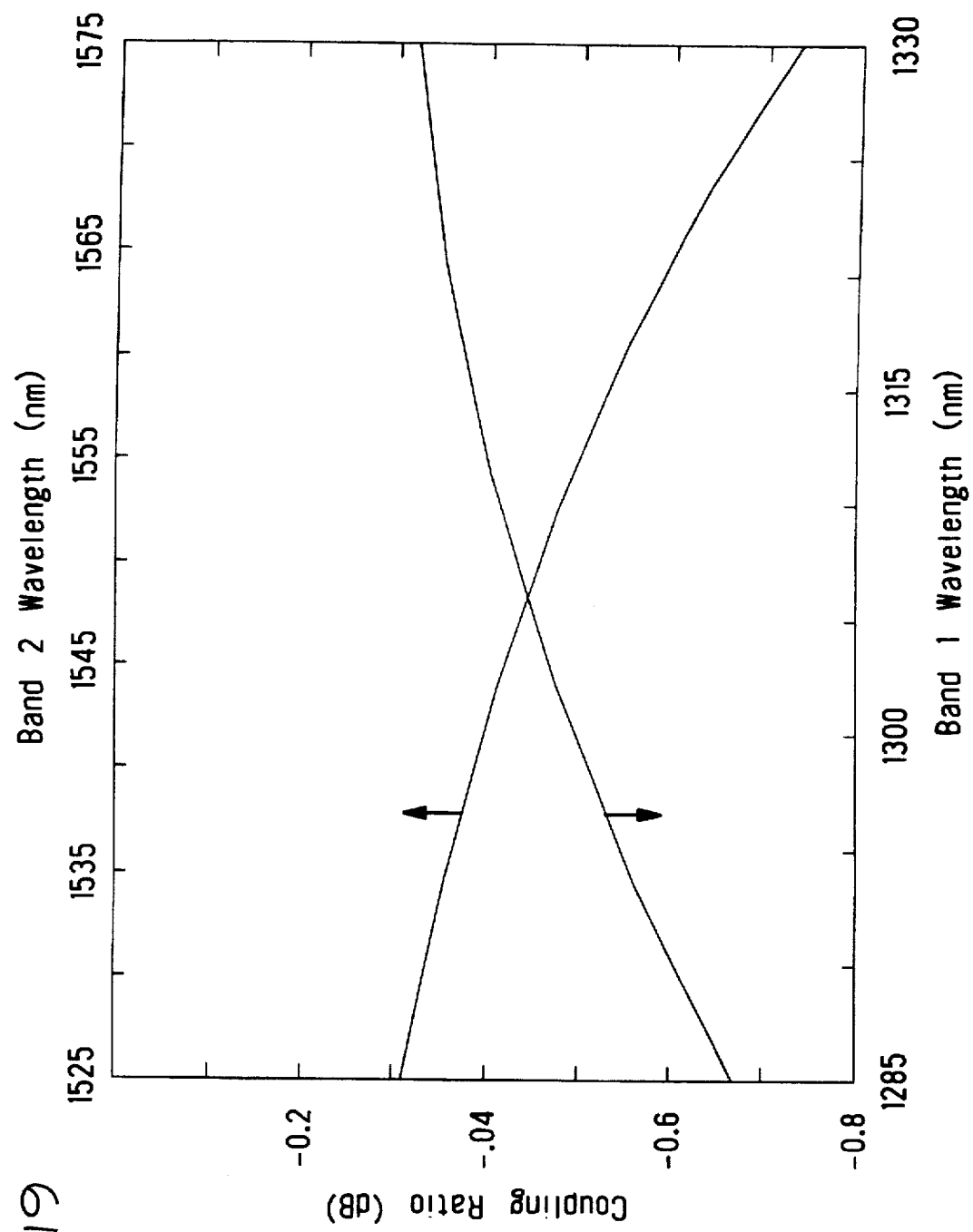
Figure 20:
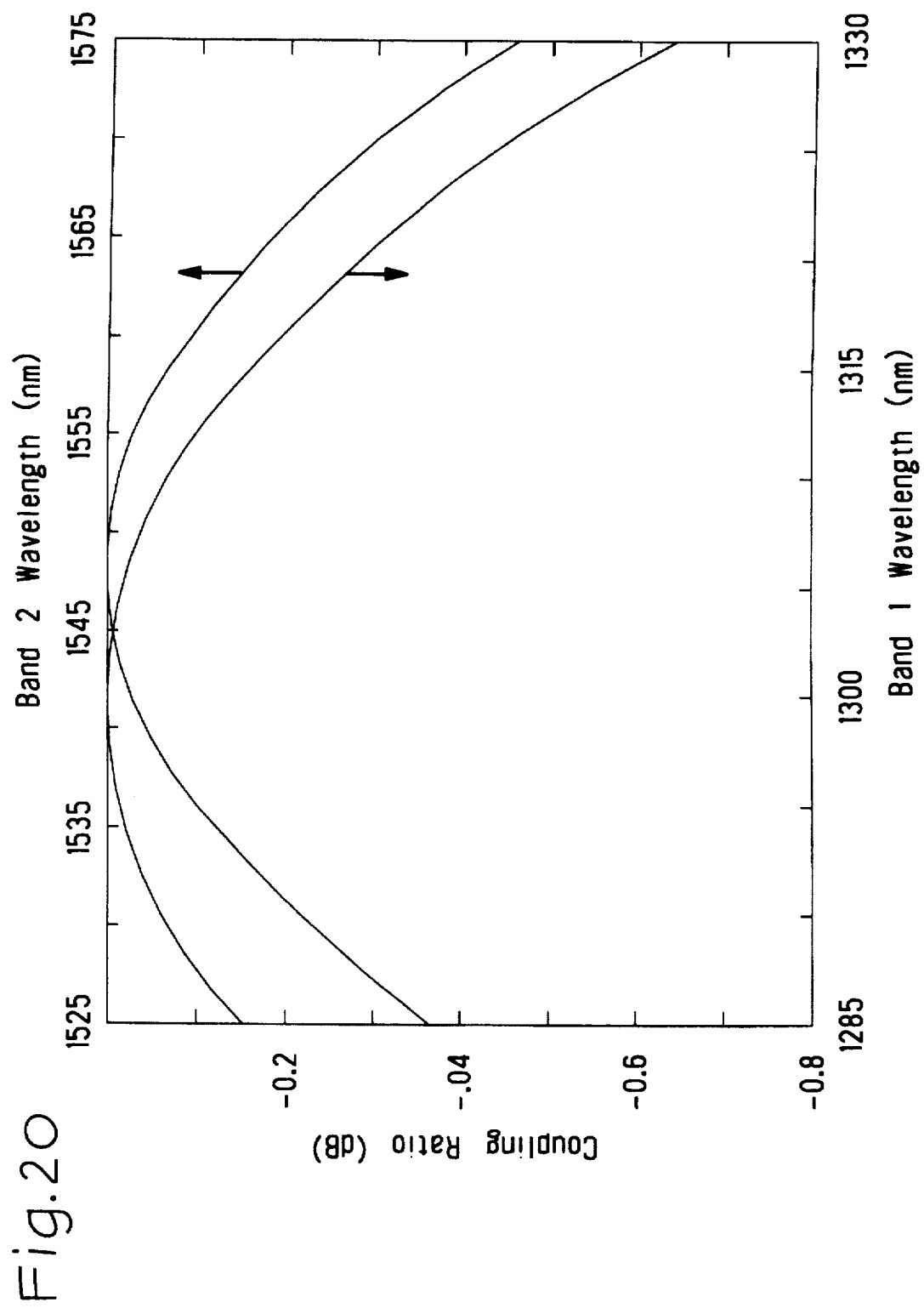

We next discuss two specific designs, for $A_{11}$ and $A_{57}$ devices. FIG. 19 shows the theoretical coupling ratio for the $A_{11}$ case as a function of wavelength across the two operating bands. The first one is from 1285 nm to 1330 nm (band 1), the second from 1525 nm to 1575 nm (band 2). This design assumes the present SMF-28 fiber parameters and has favorable values of $\delta_0$ and R. FIG. 20 shows the response curves for the $A_{57}$ case. The asymmetry across the passbands can be removed by minor adjustments of the parameters, which would also decrease the insertion loss at the upper ends of the passbands. R is undesirably large (400 cm), from the coupler fabrication standpoint. Also, the response across the passbands is not greatly better than for the A11 case. For cases in which i≠j there will always be a wavelength or wavelengths within the passband for which the coupling ratio is unity. In the present case, the response for the $A_{57}$ case drops off substantially in going away from the unity coupling wavelength because of the relatively high values of i and j. In view of the above considerations, we have chosen the $A_{11}$ design for use in our first dual-band switch model.

Figure 21:
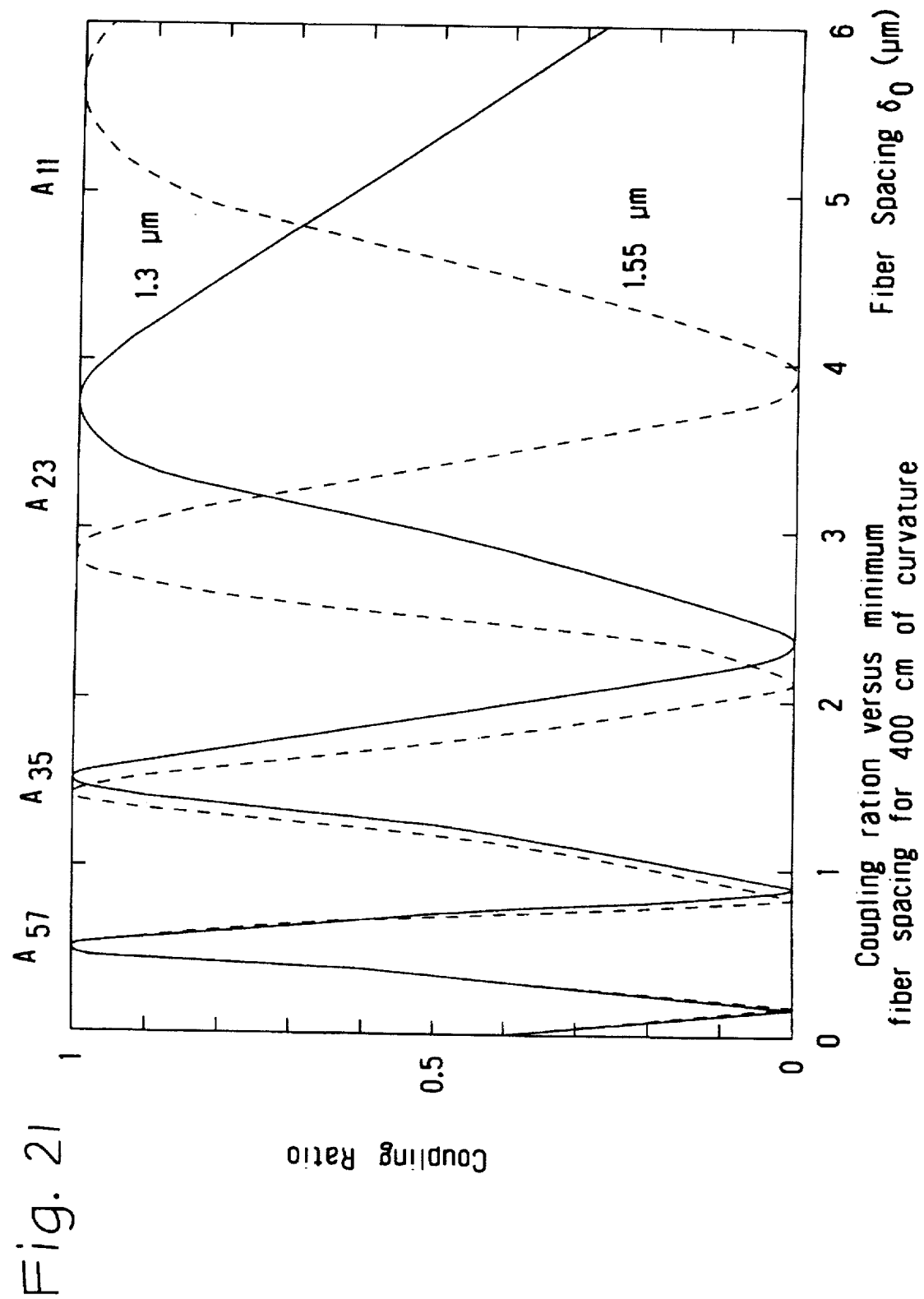
FIG. 21 is a plot of coupling ratio as a function of minimum fiber core spacing.

In arriving at designs of this kind, plots of K=$\sin^2$(CL) as a function of $\delta_0$, for fixed R, are useful. FIG. 21 is an example of such a plot. Many such plots were used in searching for possible designs. In FIG. 21, R is taken to be 400 cm. We see that a coincidence of unity coupling peaks for the 1.3µm and 1.55µm curves occurs for $\delta_0$≈0.5µm. This corresponds to the $A_{57}$ design given in FIG. 20. We also see from this figure that an $A_{35}$ switch is possible at this value of R, but that $A_{23}$ and $A_{11}$ designs would have excessive coupling losses as the curves intersect at values of K too far below unity.

The parameters for the type $A_{11}$ switch design chosen for a particular embodiment using SMF-28 CPC3 fiber are $\delta_0$=1.465µm and R=25 cm. The transverse displacement between fiber cores is an adjustable parameter for tuning of the switch after assembly.

Coupling Ratio Dependence on the Degree of Polishing

Ideally, for the coupling ratio of a polished coupler to remain within a given range of values (say between 0 and –0.8 dB) over a given range of wavelengths, the two fibers must be polished until a prescribed thickness of cladding remains on top of each core. This point is illustrated in FIG. 7D, which shows the coupling ratio, in dB, as a function of signal wavelength for the two signal bands. The fiber and coupler parameters are as above. This optimum value for $\delta_0$, referred to in the following as $\delta_{0,opt}$, was dictated by the requirement that the average coupling ratio for the two coupling curves shown in FIG. 19, one for each signal band, be as high as possible. This is satisfied when the two curves intersect at the center of each band, as shown in FIG. 19.

In practice the exact value of $\delta_0$ is difficult to measure accurately, and it is difficult to stop polishing just when $\delta_0$ has reached the optimum value $\delta_{0,opt}$. The first question that we need to answer is therefore how sensitive to $\delta_0$ are the curves of FIG. 19.

Figure 22:
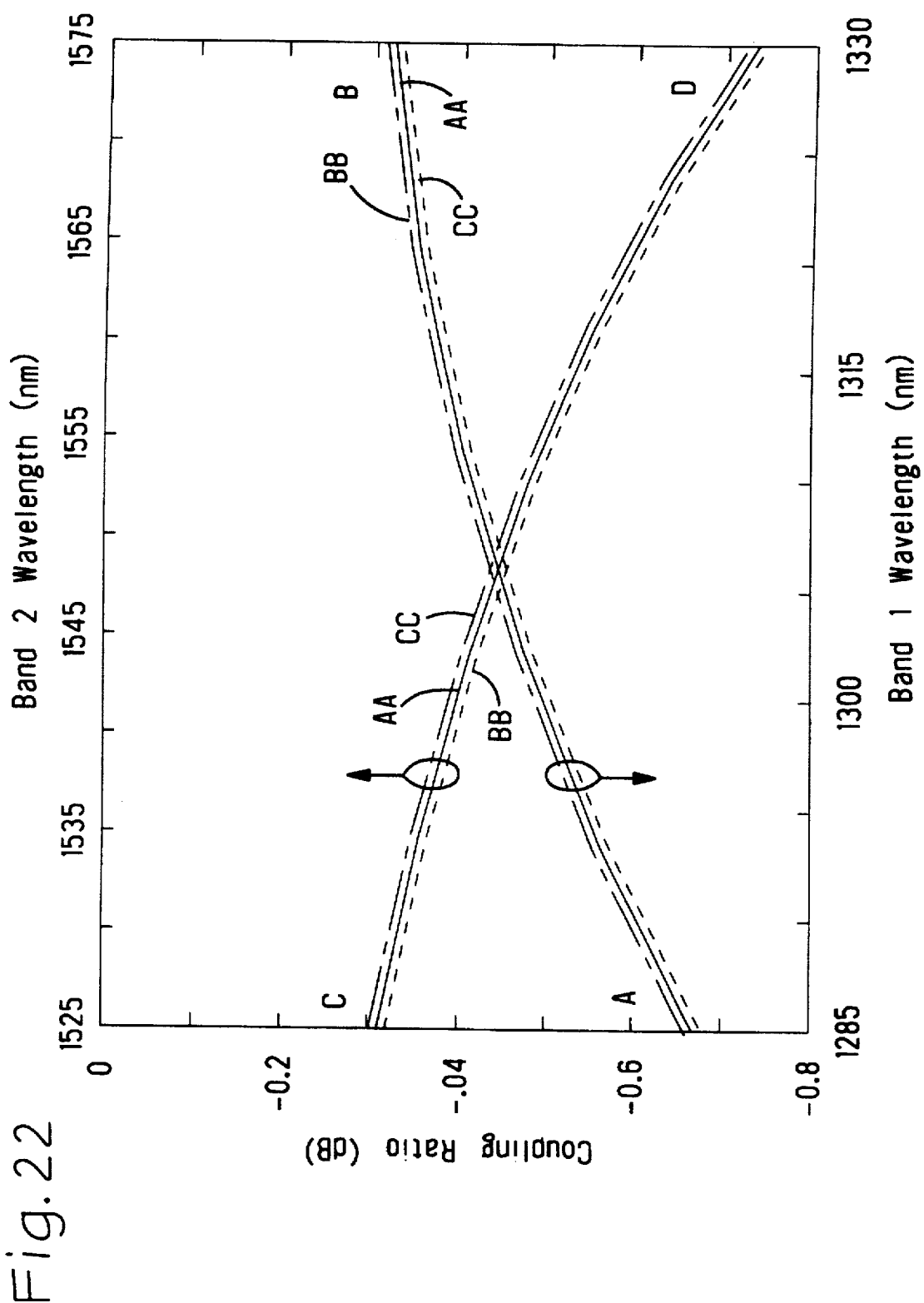
FIG. 22 shows plots of coupling ratio as a function of wavelength for different minimum fiber core spacings.

FIG. 22 shows the same curves as FIG. 19 (solid lines), computed for the optimum value $\delta_{0,opt}$=1.465µm, as well as two other curves. The curve of interest here is the dashed curve, which represents the coupling ratio for $\delta_0$=$\delta_{0,opt}$+$\Delta d_0$, with $\Delta\delta_0$=–0.003µm. The effect of this undercut is to essentially shift the two curves in the wavelength space. The end points of the curve for band 1 (points A and B) are shifted up, i.e., in the right direction of higher coupling. The same is true for the lower wavelength end of the curve for band 2 (point C). However, the upper wavelength end of this same curve (point D) is shifted down, towards lower coupling. From FIG. 22 we can infer that the change in coupling ratio is about 0.007 dB for a $\Delta\delta_0$ of –0.003µm, or –2.34 dB/µm. Assuming linearity, this implies that for the coupling ratio at point D to remain within, say 0.1 dB of its original value, without any other compensation, the fiber undercut would need to be restricted to 0.02µm each. This is an unrealistic constraint in practice.

Surprisingly, however, this problem can be avoided by intentionally over-polishing each fiber to a smaller value of $\delta_0$, (0≤$\delta_0$≤$\delta_{0,opt}$) and to compensate for the resulting change in the coupling ratio resulting from this smaller value of $\delta_0$ by offsetting the fibers with respect to each other. This offset can be applied laterally (perpendicular to the plane in which the fibers reside), or longitudinally (in the general direction of the fibers). The first-order effect of either one of these offsets is to increase the spacing between the fiber cores, and therefore to decrease the coupling ratio. Now we examine the consequences of each of these two methods.

Correction of Over-Polishing by Lateral Offset

Figure 23:
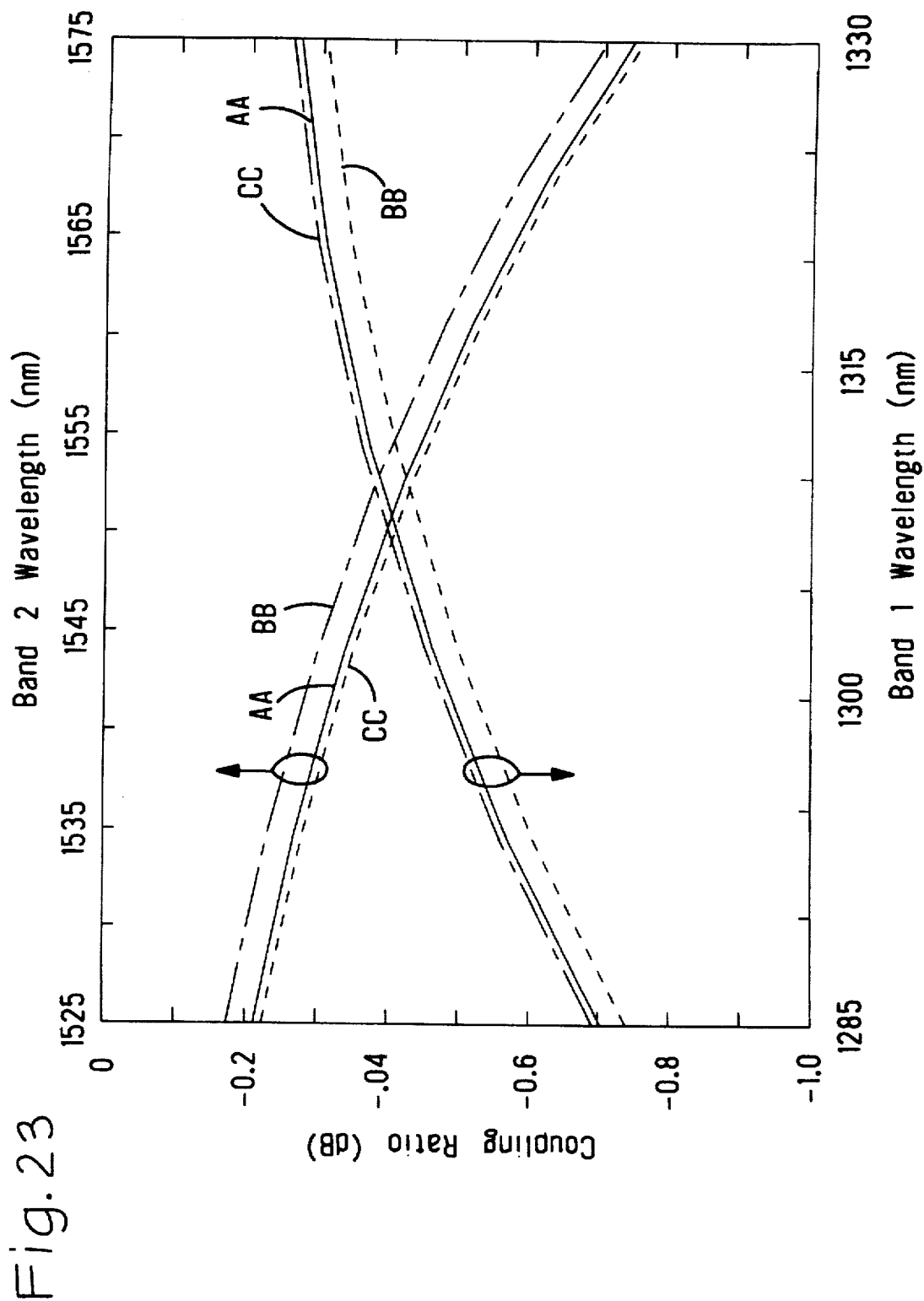
FIG. 23 shows plots of coupling ratio as a function of wavelength for different lateral offsets.

The effect on the coupling curves of a lateral offset y applied between the two fibers is shown in FIG. 23. The values used in this case are $\delta_0=0.698\mu m$ and $y=4\mu m$. (Ideally we would want to start from a given value of $\delta_0<\delta_{0,opt}$, say 1$\mu m$, and compute the corresponding value of the offset y such that the two curves cross in the middle of the bands. However, for practical reasons the simulations converge faster by choosing y first, then computing the value of $d_O$ matched to it, which explains the odd value of $d_O$ in this example. The simulations could be modified to work just as well the other way around). The solid curves in FIG. 23 show the baseline coupling ratio, for $\delta_0=0.698\mu m$ and $y=4\mu m$. Again, by definition they intersect in the center of the wavelength ranges. The curves are almost at the same positions as in FIG. 19, which establishes the equivalence of the two couplers ($\delta_0=\delta_{0,opt}=1.465\mu m$, $y=0\mu m$) and ($\delta_0=0.698\mu m$, $y=4\mu m$). In other words by applying the right lateral offset an over-polished coupler can be made to have the same passband behavior as an optimum coupler.

The next question concerns the sensitivity of these curves to the values of $\delta_0$ and y. This question is relevant since during the mechanical actuating of the switch, these two parameters will exhibit finite shot-to-shot variations. The dashed curves show what happens when $\delta_0$ is changed by a small amount ($\Delta\delta_0=+0.03\mu m$). The relative change in coupling is lower than before (1.33 dB/$\mu m$). This value implies that to stay within 0.1 dB of the baseline curves (solid curves), the value of $\delta_0$ should not vary by more than $\pm 0.075\mu m$ from shot to shot. This is a small number. However, the fibers are forced to come to rest against each other at each closing of the switch, which will provide a reference plane and a high degree of reproducibility. Care is taken to apply a constant force to the fiber switch when the fibers are closed.

Variations in the coupling ratio curves as the value of y is changed are also shown in FIG. 23 (dot-dashed curves). For a change in y of +0.02$\mu m$, the curves shift by about 0.02 dB, which corresponds to a slope of about 1 dB/$\mu m$. Again the change in coupling with lateral offset is not linear, but we can estimate that to keep the coupling ratio within 0.1 dB of the lowest value, y must not be allowed to vary by more than at most $\pm 0.1\mu m$. This is likely to be a difficult tolerance to maintain in practice, which suggests that a lateral offset may not be the preferred approach.

Correction of Over-Polishing by Longitudinal Offset

In a longitudinal offset, one of the two fibers is translated with respect to the other by an amount $\Delta z$ parallel to the direction of the fibers. It can be shown mathematically that this coupler ($\delta_0$, $\Delta z$) behaves in the same way as a coupler ($\delta_0'$,$\Delta z=0$) with zero longitudinal offset and an equivalent spacing $\delta_0'$ given by:

$$\delta_0'=\delta_0+(\Delta z)^2/(4R) \quad (1)$$

where R is the radius of curvature of the fibers. This means that if each fiber is over-polished by $\delta_0/2$, i.e., if the fiber spacing is $\delta_{0,opt}-\delta_0$, the value of $\Delta z$ that needs to be applied to obtain the same coupling curves as an optimum coupler ($\delta_0=\delta_{0,opt}$, $\Delta z=0$) is:

$$\Delta z = \sqrt{4R\Delta\delta_0} \quad (2)$$

As an example, in a coupler with $\Delta\delta_0=0.5\mu m$ the required value for the longitudinal offset is $\Delta z=707\mu m$. This value is well within the convenient practical range.

Because the value of $\Delta z$ is large, the coupling ratio is expected to exhibit a low sensitivity to variations in $\Delta z$ of a few microns, as may be expected to occur from shot to shot as the coupler is repeatedly closed. If the coupling ratio is h, we can write $d\eta/d(\Delta\delta_0)=(d\eta/d(\Delta z))(d(\Delta z)/d(\Delta\delta_0))$. For y=0 we know from FIG. 22 that $d\eta/d\delta_0=2.34$ dB/$\mu m$. By differentiation of Eq. 2 we find $d(\Delta z)/d(\Delta\delta_0)=2R/\Delta z$, and therefore:

$$d\eta/d\Delta z=1.17\ (\Delta z)/R\ dB/\mu m \quad (3)$$

For $\Delta\delta_0=\Delta\delta_0$, $\delta_{D,opt}=1.465\mu m$ (the worst case) we find $\Delta z=1.21$ mm and $d\eta/dz=0.0057$ dB/$\mu m$. To remain within the specified 0.1 dB, $\Delta z$ should not be allowed to vary by more than $\pm 18\mu m$. This is easy to meet in practice, and very much better than the very tight tolerance on a lateral offset.

Similarly, from FIG. 22 we can see how sensitive a coupler with an optimum spacing $\delta_{p,opt}$ is to a variation in the lateral offset y. The offset between the reference curve (solid curve) and the curve corresponding to small change in y, $\delta y=0.3\mu m$ (dot-dashed curve) is small, about 0.009 dB. The change in coupling with lateral offset is not linear, but to first order we can estimate that for small values of dy the y-sensitivity of the optimum coupler is around 0.03 dB/$\mu m$. For the coupling to remain within 0.1 dB, the lateral position of the fibers must be kept at y=0 within $\pm 3.4\mu m$, which is a reasonable tolerance.

Alternative 1×2 and 2×2 Switch Architectures

Figure 24:
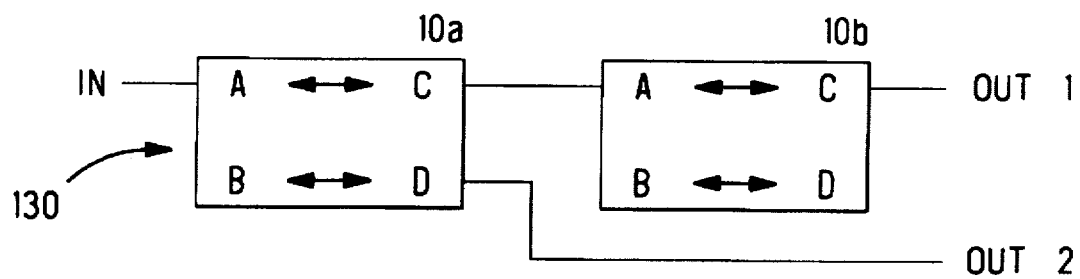
FIGS. 24 and 25 show an alternative embodiment of a 1×2 fiber optic switch comprising two basic 2×2 modules.
Figure 25:
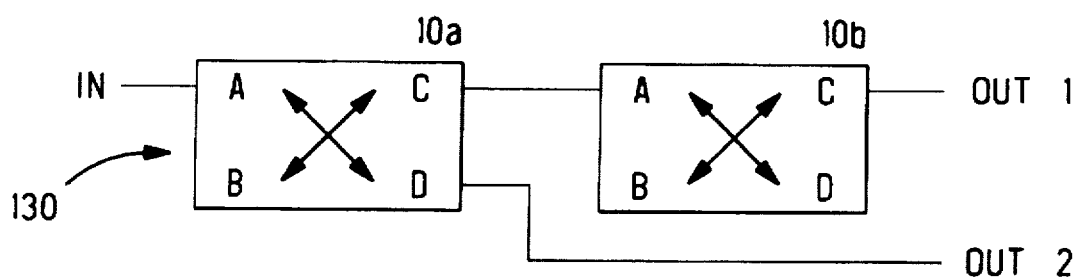

FIGS. 24 and 25 are schematics of a 1×2 fiber optic switch 130 using first and second 2×2 modules 10a and 10b, which are combined to provide a switch with low crosstalk in all states. In this embodiment, the A port of module 10a is considered the input port of the switch, the C port of module 10b is considered the first output port of the switch, and the D port of module 10a is considered the second output port of the switch. The C port of module 10a is coupled to the A port of module 10b while no connections are made to the B ports of the modules or to the D port of module 10b. The modules are constrained so that both are in the same state at any given moment. This can be accomplished by mounting respective first substrates of the modules to a common first element and respective second substrates of the modules to a common second element, moveable relative to the first element.

When operated in this direction, the switch functions to direct light at the input port to a selected one of the output ports. FIG. 24 shows a first position, where the first and second modules are in the bar state. In this position, light incoming to the input port exits the first output port, with low crosstalk in the second output port since the first module is in the bar state. FIG. 25 shows a second position, where the first and second modules are in the cross state. In this position, light incoming to the input port exits the second output port, with low crosstalk in-the first output port since both modules are in the cross state and no light is input to the second module's B port. The switch is reversible and can operate to direct light at a selected one of two input ports to a single output port.

Figure 26:
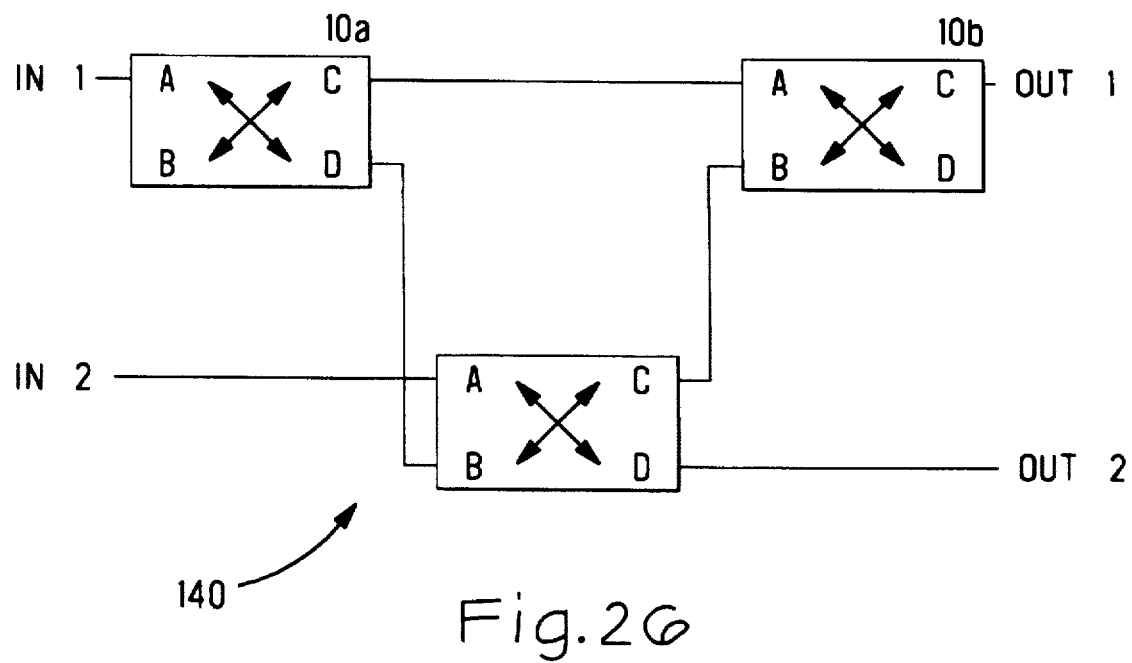
FIG. 26 shows an alternative embodiment of a 2×2 fiber optic switch comprising three basic 2×2 modules.

FIG. 26 is a schematic of a 2×2 fiber optic switch 140 comprising three 2×2 modules 10a, 10b, and 10c. In this embodiment, the B port of module 10a and the A port of module 10b are considered the input ports of the switch, and the D ports of modules 10 and 10c are considered the output ports of the switch. The C port of module 10a is coupled to the A port of module 10b, the D port of module 10c is coupled to the B port of module 10c, and the C port of module 10c is coupled to the A port of module 10b. No connections are made to the A port of module 10a or to the C port of module 10b. The modules are constrained so that all three are in the same state at any given moment. FIG. 26 shows the switch with all the modules in the cross state.

Protective Seal

Figure 29:
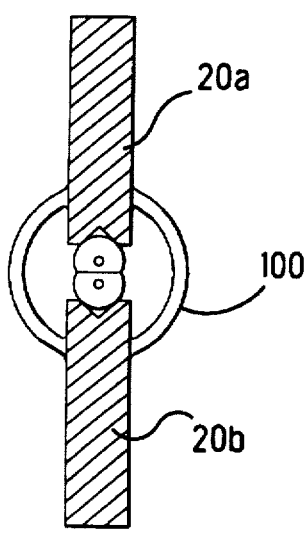
FIGS. 27–29 are top plan, end elevational, and cross-sectional views of a switch module with a protective seal.
Figure 28:
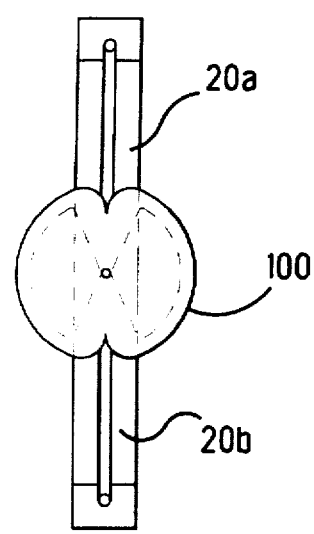
Figure 30:
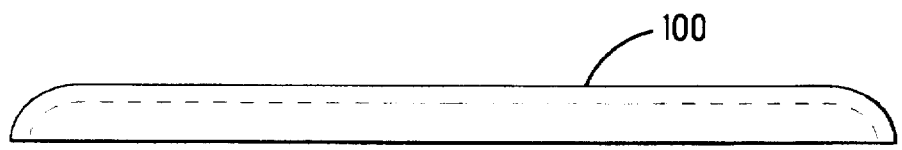
FIG. 30 is a side elevational view of one half of the protective seal.
Figure 27:
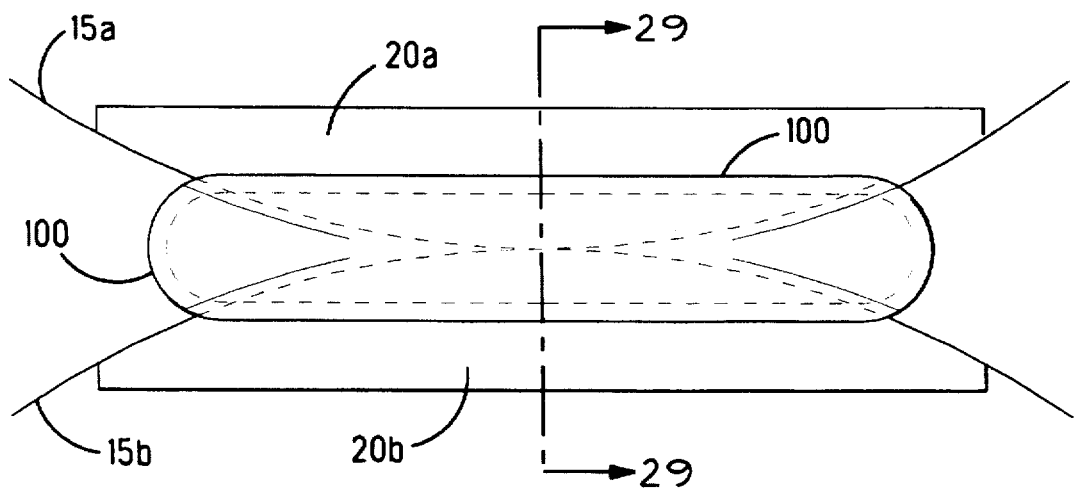

FIGS. 27–29 are top plan, end elevational, and cross-sectional views of a switch module with a protective seal 100, and FIG. 30 is a side elevational view of one half of the protective seal. The purpose of the seal is to prevent dust or other foreign material from contacting either of the polished surfaces and disrupting proper operation. The seal is made of a thin flexible material such as thin aluminum foil. The edges of the foil are compression bonded to the substrate.

Conclusion

In conclusion it can be seen that the present invention provides techniques for optimizing the performance of coupler-type fiber optic switch modules and novel architectures using such modules.

While the above is a complete description of the preferred embodiments of the present invention, various modifications, alternative constructions, and equivalents can be used.

For example, consider the mechanical structure illustrated in FIGS. 11–13, which implements the embodiment shown schematically in FIGS. 6 and 7. This structure supports the substrate pairs so that the polished surfaces face each other and can move toward and away from each other. While the particular structure represents the preferred embodiment, there are other structures that could in principle perform the same functions. Within the context of a pivoting motion, the pivot could have a hinge pin. The motion could also be translational, and one of the substrates could be mounted on guides or rails for movement relative to the other.

The structure of FIGS. 11–13 also performs the function of constraining one of the switch modules to be in the bar state when the other is in the cross state. This is, in effect, a mechanical interlock, being accomplished by having one of the substrates for each pair on the common pivoting central member so that one switch module opens as the other closes. A different approach would be to have two mechanically uncoupled switch modules controlled by separate actuators, and to provide a simple electronic circuit that caused one of the modules to be in the cross state and the other to be in the bar state. This approach could also be used for the embodiment of FIGS. 24 and 25.

The optical connections shown in FIG. 14 couple the two ports with a loop of the same length of optical fiber that forms part of each of the two switch modules. While this has the advantage of simplicity and low cost, there are other possibilities for coupling the ports of the modules. For example, a coupler utilizing a concave reflective surface, such as shown in the above-referenced U.S. Pat. No. 4,329,017, could be used.

Therefore, the above description should not be taken as limiting the scope of the invention which is defined by the claims.

What is claimed is:

1. A 1×2 fiber optic switch having an input port and first and second output ports, comprising:

first and second 2×2 switch modules, each switch module having first, second, third, and fourth ports and having first and second states;

said first state coupling light from said first port to said third port with negligible crosstalk to said fourth port and light from said second port to said fourth port with negligible crosstalk to said third port;

said second state coupling light from said first port to said fourth port with non-negligible crosstalk to said third port and light from said second port to said third port with non-negligible crosstalk to said fourth port;

means for coupling said third port of said first switch module to said first port of said second switch module; and means for constraining (a) said second switch module to be in one of said first and second states when said first switch module is in said first state and (b) said second switch module to be in the other of said first and second states when said first switch module is in said second state;

said first and second switch modules, said means for coupling, and said means for constraining together defining the 1×2 fiber optic switch with said first port of said first switch module defining the input port, said third port of said second switch module defining the first output port, and said fourth port of said first switch module defining the second output port.

2. The 1×2 fiber optic switch of claim 1 wherein:

said means for constraining operates to maintain (a) said second switch module in said second state when said first switch module is in said first state and (b) said second switch module in said first state when said first switch module is in said second state;

whereby when said first and second switch modules are in said first and second states, respectively, light at the input port is coupled to the first output port with crosstalk to the second output port being at the negligible level that characterizes said first switch module in said first state, and when said first and second switch modules are in said second and first states, respectively, light at the input port is coupled to the second output port with crosstalk to the first output port being at a lower level than the negligible level that characterizes said second switch module in said first state.

3. The 1×2 fiber optic switch of claim 1 wherein:

said means for constraining operates to maintain (a) said second switch module in said first state when said first switch module is in said first state and (b) said second switch module in said second state when said first switch module is in said second state;

whereby when said first and second switch modules are in said first state, light at the input port is coupled to the first output port with crosstalk to the second output port being at the negligible level that characterizes said first switch module in said first state, and when said first and second switch modules are in said second state, light at the input port is coupled to the second output port with crosstalk to the first output port being at a lower level than the non-negligible level that characterizes said second switch module in said second state.

4. A 1×2 fiber optic switch having an input port and first and second output ports, comprising:

first and second 2×2 switch modules, each switch module having first, second, third, and fourth ports and having first and second states;

said first state coupling light from said first port to said third port with negligible crosstalk to said fourth port and light from said second port to said fourth port with negligible crosstalk to said third port;

said second state coupling light from said first port to said fourth port with non-negligible crosstalk to said third port and light from said second port to said third port with non-negligible crosstalk to said fourth port;

each of said 2×2 switch modules including first and second segments of optical fiber, each segment having a core and a surrounding cladding, first and second substrates, each having a convex surface;

said first and second segments being mounted to said first and second convex surfaces of said first and second substrates, each segment having first and second longitudinally spaced sections of full cladding thickness and a third section between said first and second sections, each of said third sections having a portion ground with a substantially flat surface so that the cladding is less than full thickness in said third sections and each flat surface includes a location of minimum cladding thickness, and means for supporting said substrates so that said substantially flat surfaces of said third sections are in a facing relationship, said means for supporting permitting said substrates to assume a first position wherein said flat surfaces are separated from each other and a second position wherein said flat surfaces are in optical contact with each other, said first position defining said first state and said second position defining said second state, said first and second sections of said first segment defining said first and third ports, respectively, and said first and second sections of said second segment defining said second and fourth ports, respectively;

means for constraining said second switch module to be in one of said first and second states when said first switch module is in said first state and for constraining said second switch module to be in the other of said first and second states when said first switch module is in said second state;

means for coupling said third port of said first switch module to said first port of said second switch module; and said first and second switch modules, said means for coupling, and said means for constraining together defining the 1×2 fiber optic switch with said first port of said first switch module defining the input port, said fourth port of said second switch module defining the first output port, and said fourth port of said first switch module defining the second output port.

5. The switch of claim 4 wherein said means for constraining operates to maintain said second switch module in said second state when said first switch module is in said first state and to maintain said second switch module in said first state when said first switch module is in second state.

6. The switch of claim 4 wherein said means for constraining operates to maintain said second switch module in said first state when said first switch module is in said first state and to maintain said second switch module in said second state when said first switch module is in said second state.

7. A 2×2 fiber optic switch having first and second input ports and first and second output ports, comprising:

first, second, third, and fourth 2×2 switch modules, each switch module having first, second, third, and fourth ports and having first and second states;

said first state coupling light from said first port to said third port with negligible crosstalk to said fourth port and light from said second port to said fourth port with negligible crosstalk to said third port;

said second state coupling light from said first port to said fourth port with non-negligible crosstalk to said third port and light from said second port to said third port with non-negligible crosstalk to said fourth port;

means for coupling (a) said third ports of said first and third switch modules to said first ports of said second and fourth switch modules, respectively, and (b) said fourth ports of said third and fourth switch modules to said second ports of said second and first switch modules, respectively; and means for constraining said second and fourth switch modules to be in said second state when said first and third switch modules are in said first state and for constraining said second and fourth switch modules to be in said first state when said first and third switch modules are in said second state;

said switch modules, said means for coupling, and said means for constraining together defining the 2×2 fiber optic switch with said first ports of said first and third switch modules defining the input ports, said third port of said second switch module defining the first output port, and said fourth port of said first switch module defining the second output port.

8. A 2×2 fiber optic switch having first and second input ports and first and second output ports, comprising:

first, second, and third 2×2 switch modules, each switch module having first, second, third, and fourth ports and having first and second states;

said first state coupling light from said first port to said third port with negligible crosstalk to said fourth port and light from said second port to said fourth port with negligible crosstalk to said third port;

said second state coupling light from said first port to said fourth port with non-negligible crosstalk to said third port and light from said second port to said third port with non-negligible crosstalk to said fourth port;

means for coupling (a) said third port of said first switch module to said first port of said second switch module, (b) said fourth port of said first switch module to said second port of said third switch module, and (c) said third port of said third switch module to said second port of said second switch module; and means for constraining said switch modules to be all in said first state or all in said second state;

said switch modules, said means for coupling, and said means for constraining together defining the 2×2 fiber optic switch with said second port of said first switch module and said first port of said second switch module defining the input ports, said fourth port of said second switch module defining the first output port, and said fourth port of said third switch module defining the second output port.

* * * * *